US008876366B2

(12) United States Patent
Saubert

(10) Patent No.: US 8,876,366 B2
(45) Date of Patent: Nov. 4, 2014

(54) THROUGH-HEAD STAND MIXER

(75) Inventor: Michael Saubert, Hoffman Estates, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 1018 days.

(21) Appl. No.: 12/951,883

(22) Filed: Nov. 22, 2010

(65) Prior Publication Data

US 2011/0122723 A1    May 26, 2011

Related U.S. Application Data

(60) Provisional application No. 61/263,602, filed on Nov. 23, 2009.

(51) Int. Cl.
| | | |
|---|---|---|
| *A21C 1/14* | (2006.01) | |
| *B01F 9/12* | (2006.01) | |
| *A47J 43/07* | (2006.01) | |
| *B01F 7/16* | (2006.01) | |
| *A47J 43/044* | (2006.01) | |

(52) U.S. Cl.
CPC ...... *B01F 7/1615* (2013.01); *A47J 2043/04481* (2013.01); *B01F 9/12* (2013.01); *A47J 43/0705* (2013.01); *A47J 43/0711* (2013.01)
USPC .......................................... 366/197; 366/288

(58) Field of Classification Search
CPC ... A47J 43/044; A47J 43/0705; A47J 43/082; A47J 43/07; A47J 43/0711; A47J 2043/04454; B01F 15/0201; B01F 2215/0026; A21C 1/02

USPC .......... 366/197, 199, 200, 201, 209, 213, 218, 366/214, 261, 283, 284, 287, 288, 331
See application file for complete search history.

(56) References Cited

U.S. PATENT DOCUMENTS

| | | | | |
|---|---|---|---|---|
| 1,764,404 | A | * | 6/1930 | Hileman ........................ 366/222 |
| 1,935,857 | A | * | 11/1933 | Nachumsohn ................. 366/251 |
| 2,003,259 | A | * | 5/1935 | Gilbert et al. ................... 99/484 |
| 2,007,300 | A | * | 7/1935 | Gilbert et al. ................... 99/275 |
| 2,031,770 | A | * | 2/1936 | Gilbert et al. ................. 366/199 |
| 2,042,928 | A | * | 6/1936 | Da Costa ...................... 222/133 |
| 2,069,506 | A | * | 2/1937 | Ross ............................. 366/200 |
| 2,537,852 | A | * | 1/1951 | Peterson ....................... 209/355 |
| 2,616,673 | A | * | 11/1952 | Van Guilder ................. 366/197 |

(Continued)

FOREIGN PATENT DOCUMENTS

JP        2002165710        11/2006

OTHER PUBLICATIONS

Canadian Intellectual Property Office, Examiner's Requisition in Application No. 2,722,201, dated Dec. 5, 2012. (2 pages).

(Continued)

*Primary Examiner* — Tony G Soohoo
(74) *Attorney, Agent, or Firm* — McAndrews, Held & Malloy, Ltd.

(57) ABSTRACT

An embodiment of the present invention is directed to a stand mixer including a base with an upstanding pedestal portion and a mixer head supported on the pedestal portion, the mixer head having a upward-facing side, a downward-facing side and an aperture passing through the mixer head from the upward-facing side to the downward-facing side.

8 Claims, 2 Drawing Sheets

(56) References Cited

U.S. PATENT DOCUMENTS

| | | | | |
|---|---|---|---|---|
| 2,616,674 A | * | 11/1952 | Polivka et al. | 366/206 |
| 2,650,741 A | * | 9/1953 | Van Guilder | 141/363 |
| 2,710,098 A | * | 6/1955 | Tilton | 209/358 |
| 2,782,012 A | * | 2/1957 | Coyne et al. | 366/182.1 |
| 3,226,097 A | * | 12/1965 | Vayda, Jr. et al. | 366/149 |
| 3,275,051 A | * | 9/1966 | Jepson et al. | 99/502 |
| 3,672,420 A | * | 6/1972 | Hartley et al. | 83/401 |
| 4,079,917 A | * | 3/1978 | Popeil | 366/244 |
| 4,131,034 A | * | 12/1978 | Rolf | 475/11 |
| 4,337,000 A | * | 6/1982 | Lehmann | 366/288 |
| 4,478,357 A | * | 10/1984 | Jenkins | 222/135 |
| 4,946,285 A | * | 8/1990 | Vennemeyer | 366/288 |
| 5,934,802 A | * | 8/1999 | Xie | 366/100 |
| 7,740,400 B2 | * | 6/2010 | Membreno | 366/182.4 |
| 2005/0007867 A1 | * | 1/2005 | Wanat | 366/129 |
| 2005/0207273 A1 | * | 9/2005 | Newman et al. | 366/314 |
| 2007/0261566 A1 | * | 11/2007 | Varney et al. | 99/300 |
| 2009/0067279 A1 | * | 3/2009 | Mulle et al. | 366/142 |
| 2009/0110788 A1 | * | 4/2009 | Ciancimino et al. | 426/231 |
| 2009/0175123 A1 | * | 7/2009 | Membreno | 366/182.4 |
| 2011/0063941 A1 | * | 3/2011 | Seidler et al. | 366/145 |
| 2011/0122723 A1 | * | 5/2011 | Saubert | 366/200 |
| 2012/0129643 A1 | * | 5/2012 | Cheung et al. | 475/149 |
| 2012/0155215 A1 | * | 6/2012 | Verma | 366/199 |
| 2013/0074700 A1 | * | 3/2013 | Cheung | 99/348 |

OTHER PUBLICATIONS

Canadian Patent Office, Office action in Application No. 2,722,201, dated Feb. 21, 2014. (3 pages).

* cited by examiner

THROUGH-HEAD STAND MIXER

RELATED APPLICATION INFORMATION

This application claims the benefit of U.S. Provisional Patent Application No. 61/263,602 filed on Nov. 23, 2009, which is incorporated herein by reference in its entirety.

BACKGROUND

1. Field

Embodiments of the present invention generally relate to the field of stand mixers.

2. Background

Stand mixers have been staples in households for decades. During that time, however, the overall design of the conventional stand mixer has changed little. For instance, the conventional stand mixer generally includes a base with an upstanding pedestal portion and a mixer head hingedly supported on the pedestal portion. Within the mixer head is typically a motor configured to operate a beater.

One constraint facing stand mixers is the size of the mixer head proportionate to the mixer bowl used with the stand mixer. In particular, the mixer head must be wide enough for the beater to reach the edge of the mixing bowl in order to ensure a uniform mixing of the ingredients therein. A consequence of this constraint is that the mixer head often covers the vast majority of the opening of the mixer bowl, making it difficult to pour ingredients into the mixer bowl while the mixer head is in the down position.

Some stand mixer manufacturers have begun selling a "pouring shield" in an effort to alleviate this problem. A pouring shield is a chute-like attachment which attaches to the edge of a mixing bowl. Once attached, ingredients can be poured into the pouring shield, which then directs the ingredients into the mixing bowl.

Presently, conventional stand mixers do not provide a convenient way to add ingredients to the mixing bowl without either raising the mixer head out of the mixing bowl or requiring an additional pouring shield attachment.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a stand mixer including a base with an upstanding pedestal portion and a mixer head supported on the pedestal portion, the mixer head having a upward-facing side, a downward-facing side and an aperture passing through the mixer head from the upward-facing side to the downward-facing side.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

Figure 1:
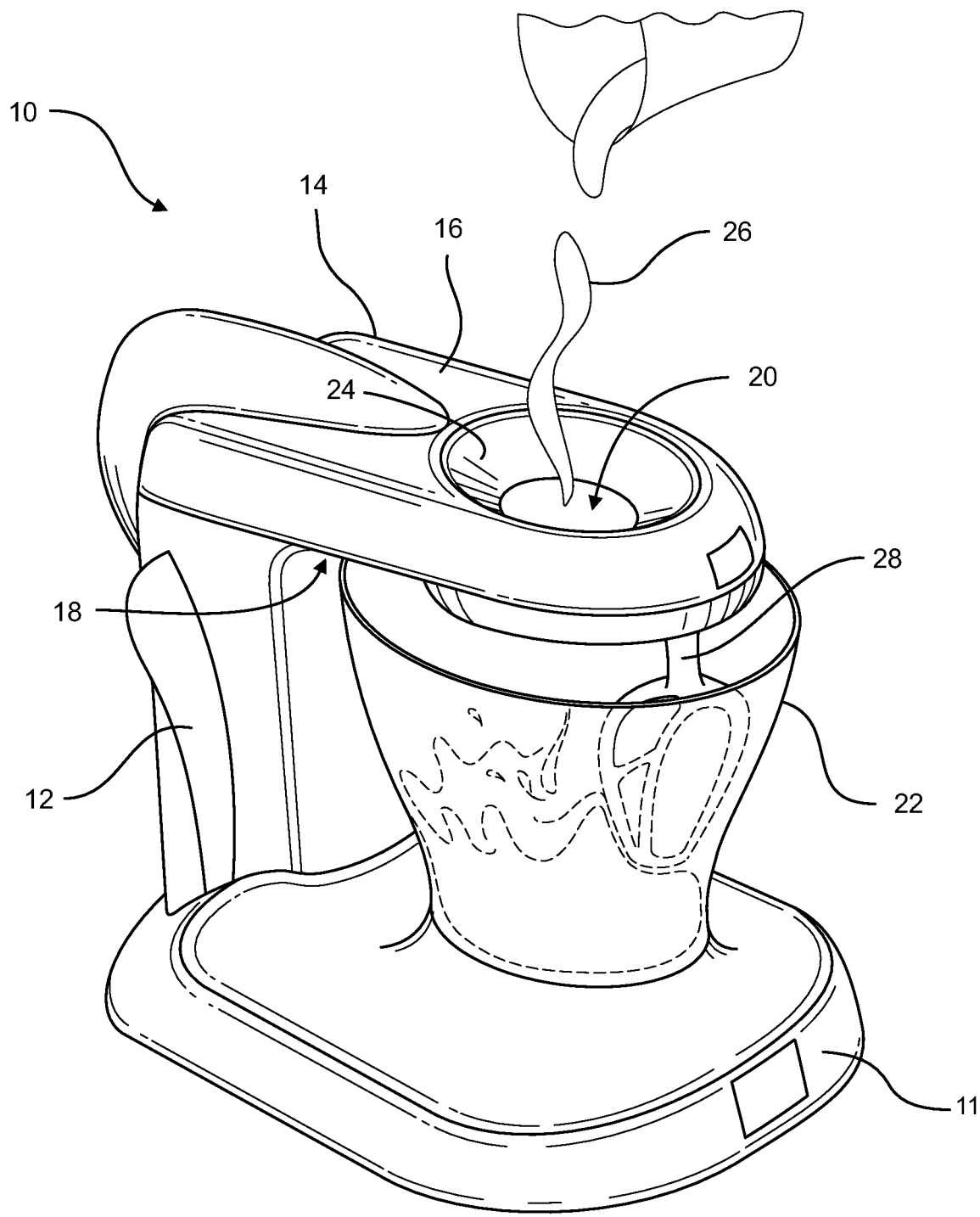
FIG. 1 is a perspective view of a stand mixer in accordance with an embodiment of the present invention.
Figure 2:
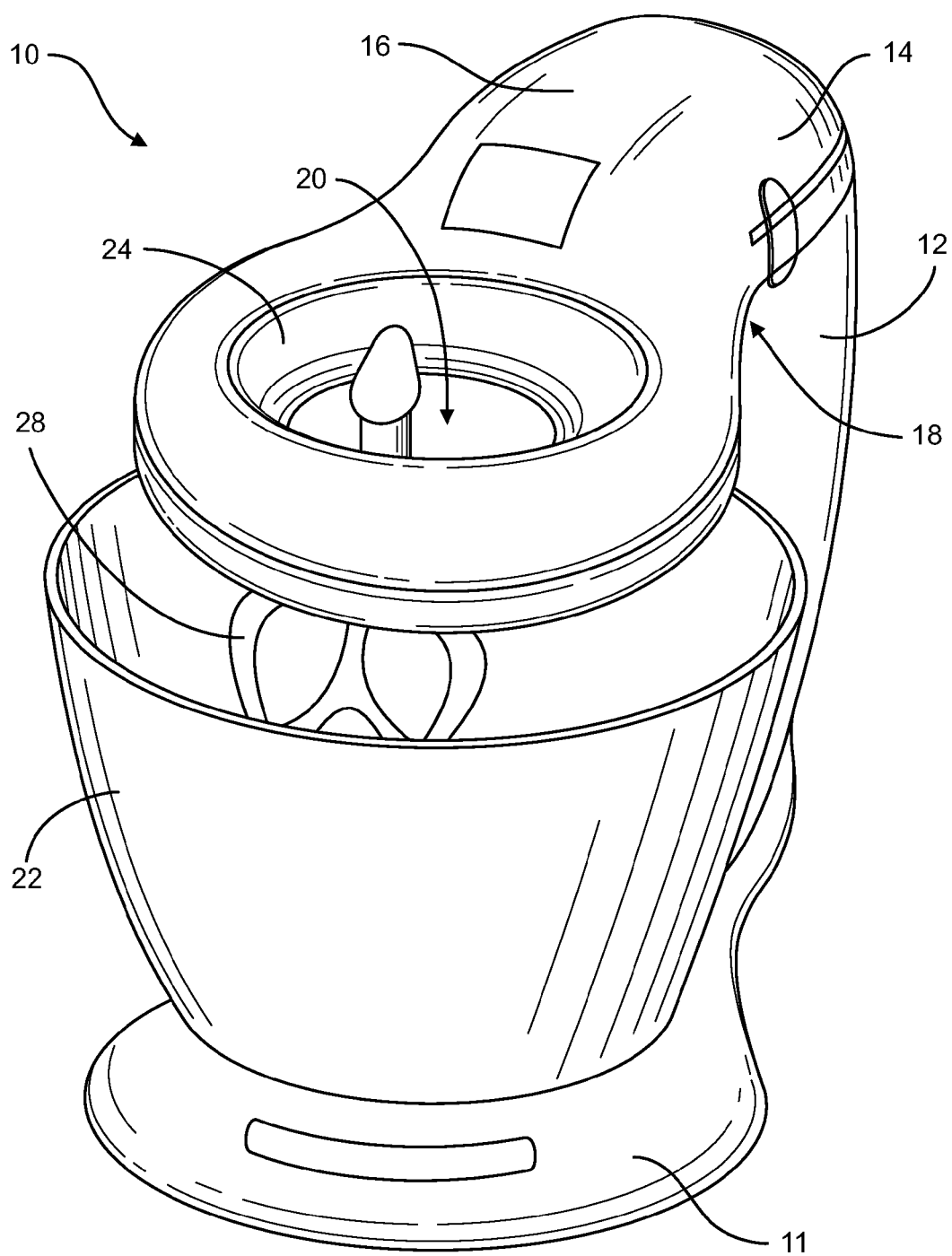
FIG. 2 is a perspective view of a stand mixer in accordance with an alternative embodiment of the present invention.

Generally speaking, embodiments provide for a stand mixer having a "through-head," wherein ingredients may be poured directly through the mixer head and into the mixer bowl. FIGS. 1 and 2 illustrate alternative embodiments of stand mixers 10 in accordance with embodiments of the present invention. As shown, the stand mixers 10 each include a base 11 with an upstanding pedestal portion 12, and a mixer head 14 supported on the pedestal portion 12. In various embodiments, the mixer head 14 may be hingedly supported on the pedestal portion 12. The base 11 of the mixer 10 may include rotatable turntable for supporting a mixing bowl 22, such as the rotating turntable disclosed in U.S. Pat. No. 5,782,558, which is hereby incorporated by reference.

Significantly, the mixer head includes an aperture 20 passing through the mixer head 14 from an upward-facing side 16 thereof to a downward-facing side 18. As a result of the aperture 20 passing through the mixer head 14, ingredients 26 may be poured directly through the mixer and 14 and into the mixer bowl 22 disposed generally below the aperture 20.

In order to accommodate the presence of the aperture 20 through the mixer head 14, the beater 28 may be driven in a generally circular path around the aperture 20 by means of a ring gear. The ring gear is further configured to also cause the beater 28 to rotate while the beater 28 is traveling along the generally circular path around the aperture 20, so as to provide further beating.

In one embodiment, the upward facing side 16 of the mixer head 14 includes a tapered "funneling" surface 24 disposed generally around the aperture 20 and configured to encourage ingredients 26 into the aperture 20. The funneling surface 24 and may further include the removable funnel overlay that is positionable substantially over the funneling surface 24 and likewise encourages ingredients 26 into the aperture 21 and the overlay is attached to the funneling service 24. The inclusion of the removable funnel overlay allows for easier cleanup.

Accordingly, embodiments provide for an improved to stand mixer having an aperture passing through a mixer head thereof, which thereby enables convenient for a other ingredients in two the mixer bowl without requiring the mixer had to be tilted up and out of the mixer bowl and without the need for a separate pouring shield attachment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A stand mixer comprising:
a base with an upstanding pedestal portion and a base portion for supporting a mixing bowl; and a mixer head supported on said pedestal portion, said mixer head having a housing with an upward-facing side, a downward-facing side and an aperture passing through said housing of said mixer head from said upward-facing side to said downward-facing side, said aperture generally positioned over said base portion, said aperture enabling pouring of ingredients through said aperture of said housing and into said mixing bowl when said mixing bowl is positioned on said base portion, said mixer head comprising a ring gear disposed within said mixer head and generally surrounding said aperture.

2. The stand mixer as recited in claim 1 wherein said upward-facing side includes a funneling surface around said aperture so as to encourage ingredients into said aperture.

3. The stand mixer as recited in claim 2 comprising a removable funnel positionable substantially over said funneling surface, wherein said funnel encourages ingredients into said aperture when said funnel is attached to said stand mixer.

4. The stand mixer as recited in claim 1 wherein said ring gear is operable to drive a beater.

5. The stand mixer as recited in claim 4 wherein said ring gear is operable to drive said beater along a generally circular path.

6. The stand mixer as recited in claim 5 wherein said ring gear is operable to drive said beater along a generally circular path while also rotating said beater.

7. The stand mixer as recited in claim 1 wherein said mixer head is hingedly coupled with said pedestal portion so as to pivot between an up position and a down position.

8. The stand mixer as recited in claim 1 wherein said base portion comprises a rotatable turntable.

* * * * *